(No Model.)
E. SOLVAY.
MANUFACTURE OF SODA.
No. 251,962. Patented Jan. 3, 1882.
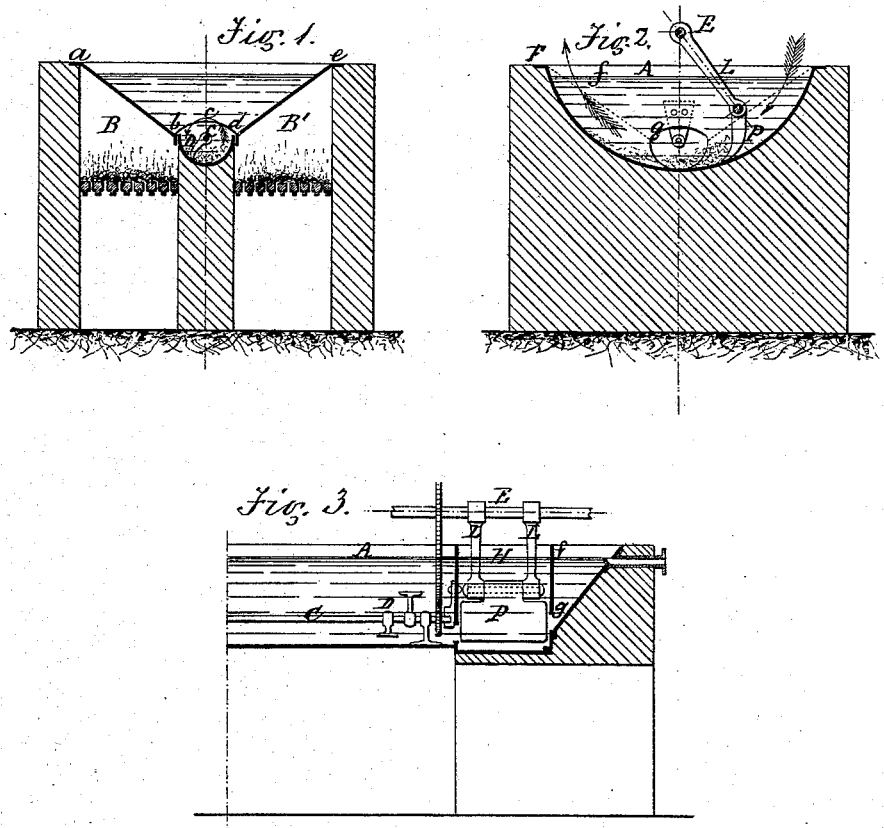
Witnesses.
A. H. Norris.
J. A. Rutherford
Inventor
Ernst Solvay.
by James L. Norris.
Atty.

UNITED STATES PATENT OFFICE.

ERNEST SOLVAY, OF BRUSSELS, BELGIUM.

MANUFACTURE OF SODA.

SPECIFICATION forming part of Letters Patent No. 251,962, dated January 3, 1882.

Application filed March 31, 1881. (No model.) Patented in England June 16, 1879.

*To all whom it may concern:*

Be it known that I, ERNEST SOLVAY, of Brussels, Belgium, have invented new and useful Improvements in the Manufacture and Treatment of Soda, (for which I have obtained a Patent in Great Britain, No. 2,387, bearing date the 16th of June, 1879,) of which the following is a specification.

My invention relates to the manufacture of soda by the process generally known as the "ammonia process," for which Letters Patent were granted to me in the United States, dated the 4th of March, 1873, and which process, as further improved by me, is described in the specification of Letters Patent granted to me, bearing date the 16th of October, 1877, and the 25th of December, 1877.

My present improvements relate to improvements in the concentration of the waters obtained from the distillation of ammonia and in the withdrawal therefrom of the residual sea-salt and chloride of calcium. When the soda manufactory is situated at a distance from the localities where a supply of sea-salt may be obtained it may be desirable to collect the salt contained in the distilled waters, and also to obtain the chloride of calcium in the form of a concentrated liquid, or in a dry state, either combined with a certain quantity of water or not. To perform this operation a large quantity of water would have to be evaporated, and so much fuel would be consumed that the cost of the operation would render it profitless.

My invention consists in the process and apparatus hereinafter described for the treatment of the distilled liquid, by which, at a trifling cost, chloride of sodium on the one part and chloride of calcium on the other part may be obtained.

The said apparatus is represented in Figures 1, 2, and 3 of the accompanying drawings, Fig. 1 being a transverse section of Fig. 3, which represents a portion of the said apparatus in longitudinal section, and Fig. 2 being another transverse section of Fig. 3.

The apparatus consists of a long iron boiler, A, the sides of which, at one part, are inclined or V-shaped to near the bottom, where they form together a semi-cylinder of relatively small diameter. The said V-shaped sides of the boiler are heated by a furnace, B B', or from any suitable source of heat. The central, under, or semi-cylindrical part, which constitutes a sort of longitudinal gutter, in which the salt is precipitated, is not heated, so that all the salt precipitated from the liquid in consequence of the evaporation falls into that portion of the boiler where the liquid is not stirred up by the boiling. The after part of the said boiler is of a semi-cylindrical shape. A rotatory shaft, C, provided with a helical blade, or with helical arms D, upon it, extends throughout the length of the boiler and causes the salt precipitated in the bottom gutter to pass to the semi-cylindrical end of the boiler, where the concentration of the brine is greatest, and where a second rotatory shaft, E, is provided with arms L and hinged knives or blades P, which scrape up the salt and throw it over the side F of the boiler, from which it falls into driers or lixiviators. The working of the said boiler is continuous, the liquid to be evaporated is fed into it at the front end, and the salt is removed, and the concentrated liquid containing only chloride of calcium is drawn off at the other end, where it may be run into vessels of any suitable shape, in which it congeals as it cools.

In order to prevent the liquid as it passes through the boiler from becoming mixed and of average density throughout, sheet-iron partitions $b\ c\ d$ are at certain distances riveted to the inclined sides of the boiler, the said partitions extending downward to the small semi-cylindrical gutter at the bottom of the boiler, care being taken that they do not interfere with the action of the revolving arms. The after or semi-cylindrical part of the boiler is not heated. The salt is collected at H, in which is fitted a partition, $f\ g$, by which the concentrated liquid is kept at rest, and may be decanted completely. The distilled liquid to be evaporated always contains a certain quantity of lime in solution. To prevent the said lime from mixing with the precipitated salt, or from forming incrustations, I saturate the lime with hydrochloric acid by pouring a small quantity of the acid into the distilled liquid. By this means chloride of calcium is formed, which mixes with the chloride of calcium already in the boiler.

The residual salt obtained from the distilled liquid, as hereinbefore described, is impregnated with a considerable quantity of the concentrated solution of chloride of calcium, from which it is taken, and it is very important that the salt should be separated therefrom.

I claim as my invention—

1. The herein-described process of concentrating the waters obtained from the distillation of ammonia in the manufacture of ammonia soda, so as to collect therefrom the sea-salt and chloride of calcium they contain, the same consisting in the treatment of such waters in a vessel heated to a higher temperature in its upper than in its lower portion, and precipitating the salt in the cooler portion thereof, then driving the salt into a non-heated portion of the apparatus and separating the salt from the water, and then decanting the concentrated solution of chloride of calcium from the remaining water in the apparatus and from the salt, in the manner specified.

2. The combination, with the boiler, of the furnace arranged to heat directly the upper portion of said boiler, the concentrating and decanting apparatus at one end of the boiler, and devices for driving the salt to said end of the apparatus and for removing it therefrom, substantially as described.

3. The boiler A, comprising two parts, one being V-shaped in cross-section, with a semi-cylindrical bottom, and the other being made semi-cylindrical in shape, in combination with the devices for driving the precipitated salt from the first-named part of the boiler into the said second or semi-cylindrical part, and the rotary scraper P, arranged to throw out the salt from the semi-cylindrical part of the boiler, said apparatus being connected with a furnace so that the inclined walls only of its V-shaped part will be exposed to the direct action of heat, substantially as described.

In testimony whereof I have hereunto set my hand in the presence of the subscribing witnesses.

ERNEST SOLVAY.

Witnesses:
  THOS. JAS. MALTBY,
  R. S. KIRKPATRICK.